(12) United States Patent
Pregitzer

(10) Patent No.: US 6,804,439 B1
(45) Date of Patent: Oct. 12, 2004

(54) METHOD OF ATTACHING A FIBER OPTIC CONNECTOR

(75) Inventor: Kimberly M. Pregitzer, Canton, MI (US)

(73) Assignee: Yazaki North America, Inc., Canton, MI (US)

(*) Notice: Subject to any disclaimer, the term of this patent is extended or adjusted under 35 U.S.C. 154(b) by 0 days.

(21) Appl. No.: 10/658,029

(22) Filed: Sep. 9, 2003

(51) Int. Cl.[7] .............................................. G02B 6/44
(52) U.S. Cl. ..................................................... 385/100
(58) Field of Search ................................. 385/100–114

(56) References Cited

U.S. PATENT DOCUMENTS

| | | | |
|---|---|---|---|
| 4,859,827 A | 8/1989 | Coyle, Jr. et al. | |
| 5,268,556 A | 12/1993 | Coyle, Jr. et al. | |
| 5,291,570 A | 3/1994 | Filgas et al. | |

FOREIGN PATENT DOCUMENTS

DE          19919428        11/2000

OTHER PUBLICATIONS

Kagan, Val A. et al., "Efficiency of Clear–Welding Technology for Polyamides," 5 pages.

Leaversuch, Robert, "Injection Molding: Laser Welding Comes of Age," Plastics Technology, Feb. 2002, 5 pages, Gardner Publications, Inc., www.plasticstechnology.com/articles/200202fa2.html.

"ClearWeld" web site excerpt, 2003, 2 pages, TWI Ltd., www.twi.co.uk/j32k/unprotected/band_1/clearweld.html.

"Xennia XPS 9000: Clearweld Certified Inkjet System" product brochure, 2 pages.

"Epolight Series 8000 Dyes" web site excerpt, 2002, 3 pages, Epolin, Inc., www.epolin.com/p8000.html.

*Primary Examiner*—Khiem Nguyen
(74) *Attorney, Agent, or Firm*—Young & Basile P.C.

(57) ABSTRACT

A plastic ferrule is laser welded to the stripped end of an optical fiber using a highly radiation absorptive transitory material between the outer plastic surface of the fiber and the inner plastic surface of the ferrule. The use of an intermediary transitory material of high-radiation absorbing material creates a symmetrical weld pool which contributes to higher mechanical strength in the weld area.

5 Claims, 1 Drawing Sheet

METHOD OF ATTACHING A FIBER OPTIC CONNECTOR

FIELD OF THE INVENTION

This invention relates to methods of attaching ferrules to the outer circumferential surface of optical fibers to act as terminations and/or connectors for said fibers and more particularly to a method of ferrule attachment involving welding by laser irradiation.

BACKGROUND OF THE INVENTION

For industrial application purposes, optical fibers are commonly terminated with plastic ferrules. This is done, for example, so that small diameter optical fibers can be positioned with respect to optical couplers and the like.

It is known to bond optical fibers to plastic ferrules through the use of adhesives, such as with epoxies, by mechanical crimping and by welding using an irradiation source such as a laser. Epoxy bonding is an exacting process which requires high precision in formulating, applying and curing the epoxy. Crimping is also a mechanically exacting process which, if incorrectly done, can adversely impact the optical and/or structural characteristics of the fiber. Welding is typically carried out using a plastic ferrule which is transparent to the laser radiation and a jacket on the optical fiber which fits snugly within the ferrule and which is much more absorbent to the laser radiation. This approach, however, results in highly asymmetric heating and a weld pool which is composed substantially entirely of material from the fiber jacket. Such an asymmetric weld is often mechanically weak and will not stand up to either application temperature extremes or mechanical stress created by rough handling or environmental conditions.

SUMMARY OF THE INVENTION

The present invention, in one aspect, is an improved method of welding plastic ferrules to plastic jacketed optical fibers. According to this aspect of the invention, a plastic jacketed optical fiber is provided in combination with the plastic ferrule so that the outer circumferential surface of the plastic jacket is in juxtaposed relationship to an inner circumferential surface of the ferrule. A layer of material is placed between and in contact with the two juxtaposed surfaces, which material is substantially more absorptive to radiation at a predetermined wavelength than the materials of both of the jacket and ferrule. In the preferred embodiment, the plastic material of the ferrule is substantially transparent to the predetermined wavelength radiation, whereas the material of the intermediate layer is highly absorptive as a result of its optical content. Thereafter, the combination is irradiated substantially at said wavelength to create a weld pool which, according to the preferred aspects of the invention, is highly symmetrical and extends in substantially equal amounts to equal depths into the materials of both the jacket and the ferrule. The radiation is typically from a laser.

In accordance with the second aspect of the invention, a ready-to-weld plastic jacketed optical fiber is provided. In accordance with the invention, an exposed outer surface of a plastic jacket surrounding the optical fiber is coated either circumferentially continuously or discontinuously with a second transitory material whose absorptivity to radiation at a predetermined wavelength is much higher than that of the plastic material on which it is placed. This combination is ready to place within the confines of a plastic ferrule which itself is also transparent to the predetermined wavelength radiation and which is sized to fit over and in contact with the intermediate transitory material. That combination may then be irradiated and welded as described above.

The terms "plastic" and "polymer" are used interchangeably in this document.

Other applications of the present invention will become apparent to those skilled in the art when the following description of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and wherein.

DETAILED DESCRIPTION OF THE PREFERRED EMBODIMENT

Figure 1:
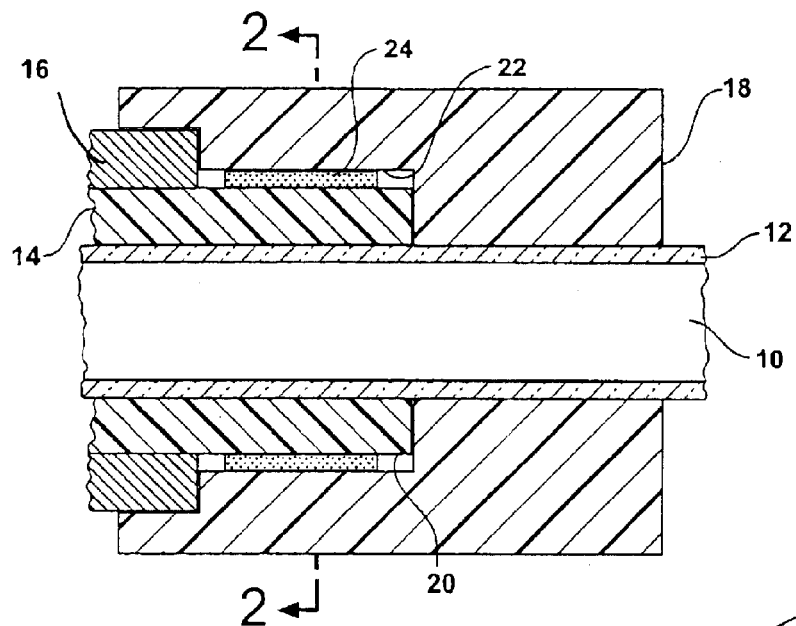
FIG. 1 is a sectional view of the juxtaposed combination of a jacketed optical fiber and a plastic ferrule with the transitory material in place prior to irradiation.
Figure 2:
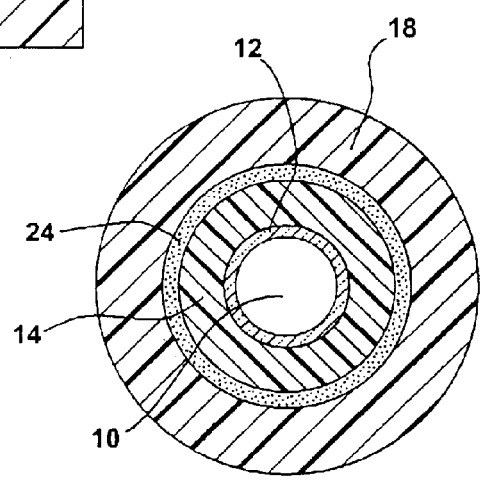
FIG. 2 is a cross-section through the components of FIG. 1.

Referring now to FIGS. 1 and 2, there is shown an optical fiber 10 having a non-strippable exterior cladding 12 of mechanically stable material and a strippable polymer layer 14 disposed over the layer 12. In this embodiment, a second strippable outer layer 16 is also provided over the layer 14 and a portion of the layer 16 has been stripped back to expose an axial length of the layer 14. In addition, the layer 14, to the extent that it once continued to the righthand terminal end of fiber 10, has also been stripped back to expose a portion of the non-strippable cladding 12.

In FIG. 1, a plastic ferrule 18 has been located over the stripped end of the optical fiber 10 such that the smallest diameter portion snugly engages the cladding 12. A larger diameter surface 22 is in juxtaposed relationship to an outside circumferential surface 20 of the strippable polymer layer 14 and an even larger diameter portion overlies the strippable outer layer 16 as shown. The juxtaposed surfaces may be fully radially spaced apart or only partly spaced to allow for a thin spot or layer of intermediary material. In this combination, an intermediary layer 24 of material which is highly absorptive to radiation from one or more sources such as lasers emitting radiation in the near infrared range is placed. The layer 24 is of such thickness as to lie between but in contact with each of the surfaces 20 and 22 as shown. Layer 24 may be one spot, several spots or an entire circumferential band.

Figure 3:
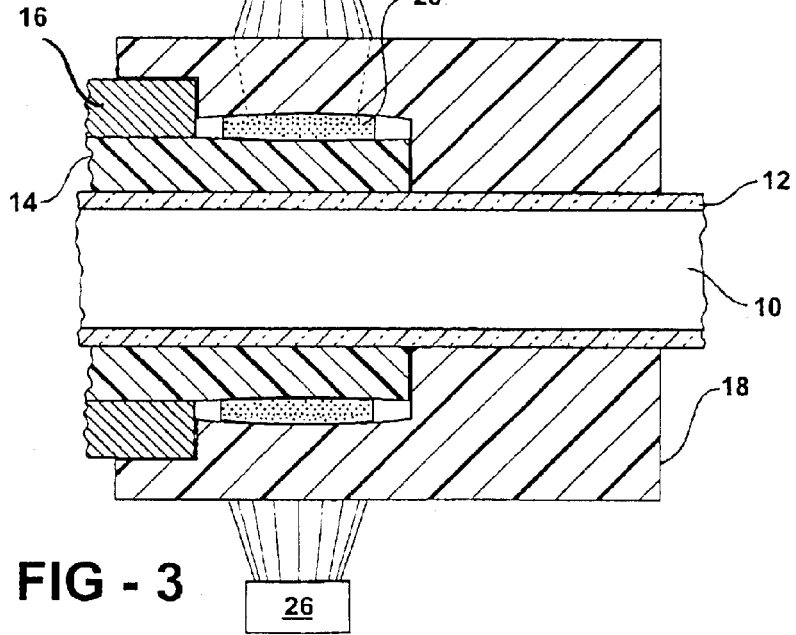
FIG. 3 shows the combination of FIG. 1 during and after radiation welding.

After providing the combination as essentially shown in FIGS. 1 and 2, one or more laser sources 26 are activated to irradiate the material 24 through the essentially transparent plastic material of the ferrule 18 as shown in FIG. 3. The transitory absorbing layer 24 creates a weld pool 28 which extends both radially outward and radially inward to essentially equal extents and to essentially equal depths such that the weld pool 28, when re-solidified, is symmetric and of maximum mechanical strength.

In a usable embodiment, the laser 26 may be a single source laser which is moved from point to point around a circumferential path or it may comprise a plurality of lasers which are activated at essentially the same time. Alternatively, it is possible to provide an arcuate or annular source of laser radiation using appropriate objects as will be apparent to those skilled in the art. The ferrule may be made of Nylon, LCP or any suitable polymer which is highly transmissive of, i.e., essentially transparent to, laser radiation in the near infrared range or transmissive to the light at whatever wavelength is used. The polymer layer 14 may be made of Tefzel, Nylon or any other suitable material. The absorptive layer 24 may be printed or applied in film form and typically comprises a material containing carbon black or other material which creates a high degree of optical absorptivity of radiation from the laser 26. Suitable materials are available from Epolin Inc. and are referred to in the literature as infrared blocking silk screen inks capable of strongly absorbing near infrared light in the 81 nm to 1080 nm range as well as to transmit high percentage of light in the visible spectrum from about 400 nm to 750 nm. Epolin Inc. is located in Newark, N.J. 07105. A laser source having a curved or arcuate beam is described in the on-line article from *Plastics Technology*, February 2002, "Laser Welding Comes of Age," by Robert Leaversuch, Executive Editor.

This invention may be used to apply a ferrule to the terminal end of an optical fiber which has been divided or severed from a longer length fiber using the process described in co-pending application, attorney docket YAZ-173-A, filed simultaneously herewith; the entire content of such application is incorporated herein by reference.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of welding a plastic ferrule to an optical fiber comprising the steps of:

providing the combination of a plastic jacketed optical fiber and a plastic ferrule in such physical arrangement that an outer circumferential surface of the plastic jacket is in juxtaposed relationship to an inner circumferential surface of the plastic ferrule;

providing a layer of transitory material between and in contact with each of said juxtaposed jacket and ferrule which material is substantially more absorptive to radiation at a predetermined wavelength than the plastic materials of both the jacket and ferrule; and irradiating the combination substantially at said predetermined wavelength to create a weld pool which includes said material.

2. The method of welding defined in claim 1 wherein the step of irradiating the combination creates a weld pool which includes said material and in substantially equal amounts and to substantially equal depths in the materials of said jacket and ferrule.

3. The method of welding defined in claim 1 wherein the material of the ferrule is selected so as to be substantially transparent to the irradiation of said predetermined wavelength.

4. In combination:

an optical fiber having a polymeric layer circumferentially disposed therearound; and extending circumferentially around said polymeric circumferential layer, a layer of transitory material which is substantially more absorptive to radiation of a predetermined wavelength than the material of said polymer layer.

5. The combination of claim 4 further including a plastic ferrule disposed over an end of the optical fiber in substantially surrounding and contacting relationship to said layer of transitory material.

* * * * *